US012686536B2

(12) United States Patent
Ganter

(10) Patent No.: US 12,686,536 B2
(45) Date of Patent: Jul. 21, 2026

(54) DROPPER SYSTEM WITH PRE-POSITIONED WIPER

(71) Applicant: Bottle Barons, LLC, Plano, TX (US)

(72) Inventor: Benjamin Alan Ganter, Plano, TX (US)

( * ) Notice: Subject to any disclaimer, the term of this patent is extended or adjusted under 35 U.S.C. 154(b) by 0 days.

(21) Appl. No.: 19/028,786

(22) Filed: Jan. 17, 2025

(65) Prior Publication Data

US 2025/0236443 A1 Jul. 24, 2025

Related U.S. Application Data

(60) Provisional application No. 63/623,174, filed on Jan. 19, 2024.

(51) Int. Cl.
*B65D 47/18* (2006.01)
*A45D 34/04* (2006.01)
*B01L 3/02* (2006.01)

(52) U.S. Cl.
CPC ........... *B65D 47/18* (2013.01); *A45D 34/046* (2013.01); *B01L 3/0272* (2013.01)

(58) Field of Classification Search
CPC ...... A45D 34/00; A45D 34/04; A45D 34/046; B01L 3/0272; B65D 47/18
See application file for complete search history.

(56) References Cited

U.S. PATENT DOCUMENTS 1,313,566 A * 8/1919 Trowbridge .......... A61M 31/00 141/24
2,742,195 A * 4/1956 Elder, Jr. .............. B01L 3/0282 422/934
2,966,284 A * 12/1960 Lewis ................... B01L 3/0282 422/934
3,146,806 A * 9/1964 Ginsburg ............. A61M 31/00 206/229
4,768,682 A * 9/1988 Friedrich .............. B01L 3/0282 422/934
6,481,600 B2 * 11/2002 Buehler ................ G01F 11/088 222/206
11,040,342 B2 * 6/2021 Ganter ................... B65D 47/18

(Continued)

FOREIGN PATENT DOCUMENTS

KR 200453126 Y1 * 4/2011 ........... A45D 40/267
KR 20200135235 A * 12/2020 ................ B01L 3/02

(Continued)

*Primary Examiner* — Nicolas A Arnett

(74) *Attorney, Agent, or Firm* — Ferguson Braswell Fraser Kubasta PC

(57) ABSTRACT

A dropper system comprises a bulb having a body, a collar, and a flange. The body of the bulb comprises a closed end, an open end opposing the closed end, and a cavity extending between the closed end and the open end. The collar extends axially from the open end of the body and comprises a pipette coupling member that is recessed into an inner surface of the collar. The pipette coupling member is configured to retain at least a portion of a pipette proximate the cavity of the body. The inner surface is tapered between the pipette coupling member and an opening of the collar. The flange extends radially from an outer surface of the collar and comprises a lip protruding axially about a perimeter of the flange such that an annular recess is formed between the outer surface of the collar and the lip.

15 Claims, 7 Drawing Sheets

(56) References Cited

U.S. PATENT DOCUMENTS

| | | | | |
|---|---|---|---|---|
| 11,472,612 | B2 * | 10/2022 | Choi | B01L 3/0282 |
| 11,745,176 | B2 * | 9/2023 | Ganter | A45D 34/04<br>222/421 |
| 11,844,411 | B2 * | 12/2023 | Zheng | A45D 34/04 |
| 2023/0255340 | A1 * | 8/2023 | Lee | A45D 40/24<br>222/80 |
| 2023/0276921 | A1 * | 9/2023 | Zheng | A45D 34/045<br>132/317 |

FOREIGN PATENT DOCUMENTS

| | | | | |
|---|---|---|---|---|
| KR | 102343446 | B1 * | 12/2021 | B01L 3/0272 |
| KR | 102382964 | B1 * | 4/2022 | B65D 51/32 |
| KR | 102695103 | B1 * | 8/2024 | B65D 47/18 |
| KR | 102852211 | B1 * | 8/2025 | A45D 34/04 |

* cited by examiner

DROPPER SYSTEM WITH PRE-POSITIONED WIPER

CROSS-REFERENCE TO RELATED APPLICATIONS

This application claims the benefit of U.S. Provisional Application No. 63/623,174, filed Jan. 19, 2024, which is incorporated by reference herein.

BACKGROUND

A wiper insert for a dropper bottle is a small component typically found inside the neck of the bottle. These inserts are commonly used in bottles containing liquid medications, essential oils, cosmetic serums, and other related products where precise dosing and cleanliness are important. The design of the wiper insert can vary depending on the viscosity of the liquid and the desired dispensing rate.

The integration of wipers into dropper systems, while beneficial for controlling fluid dispensing and preventing leaks, presents significant challenges in the context of large-scale filling operations. These challenges primarily revolve around the complexities and inefficiencies introduced into the filling process, both when wipers are inserted prior to filling and when they are manually inserted post filling.

Pre-filling insertion complicates and potentially slows down automated processes, while post-filling manual insertion is labor-intensive and less efficient. Both methods can lead to increased production costs, reduced throughput, and potential quality control issues, making wipers less favored in high-volume filling operations.

For example, presence of a wiper insert narrows the opening of the bottle neck. This restriction can slow down the process of filling the bottle, as the liquid needs to pass through a smaller opening. Furthermore, as liquid is added to the bottle, the wiper insert can impede the flow of air out of the bottle, slowing down the fill rate because the incoming liquid and outgoing air are competing for the same narrow space. For thicker liquids, the impeded fill rate can be particularly noticeable, as the viscous liquid moves through the wiper's restricted opening, such as when filling bottles with gels, oils, or serums. Filling equipment might need to be adjusted or operated at a slower rate to accommodate the presence of a wiper insert, ensuring that the liquid is filled without causing overflow or foaming.

On the other hand, manually inserting wipers after the filling process also has its drawbacks. Manual insertion of wipers is a labor-intensive process that significantly slows down the overall production rate, as each bottle must be individually managed for wiper insertion. These manual processes require more human labor, and are prone to human error and inconsistencies, which directly translates to higher labor costs. In a large-scale operation, the cost of additional labor required for manual wiper insertion can be substantial, impacting the overall profitability.

SUMMARY

According to embodiments, A dropper system comprises a bulb having a body, a collar, and a flange. The body of the bulb comprises a closed end, an open end opposing the closed end, and a cavity extending between the closed end and the open end. The collar extends axially from the open end of the body and comprises a pipette coupling member that is recessed into an inner surface of the collar. The pipette coupling member is configured to retain at least a portion of a pipette proximate the cavity of the body. The inner surface is tapered between the pipette coupling member and an opening of the collar. The flange extends radially from an outer surface of the collar and comprises a lip protruding axially about a perimeter of the flange such that an annular recess is formed between the outer surface of the collar and the lip.

In another embodiment, a method is provided for filling a bottle. The method includes pre-positioning a wiper around a collar of a bulb. The wiper is removably coupled within an annular gap of a flange that extends radially from an outer surface of the collar. The method further includes delivering a fluid to the bottle through a neck having an opening extending therethrough that provides access to an interior of the bottle. The method additionally includes inserting the collar of the bulb into the opening of the bottle. The wiper is retained in the neck such that withdrawing the collar does not remove the wiper from the neck.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
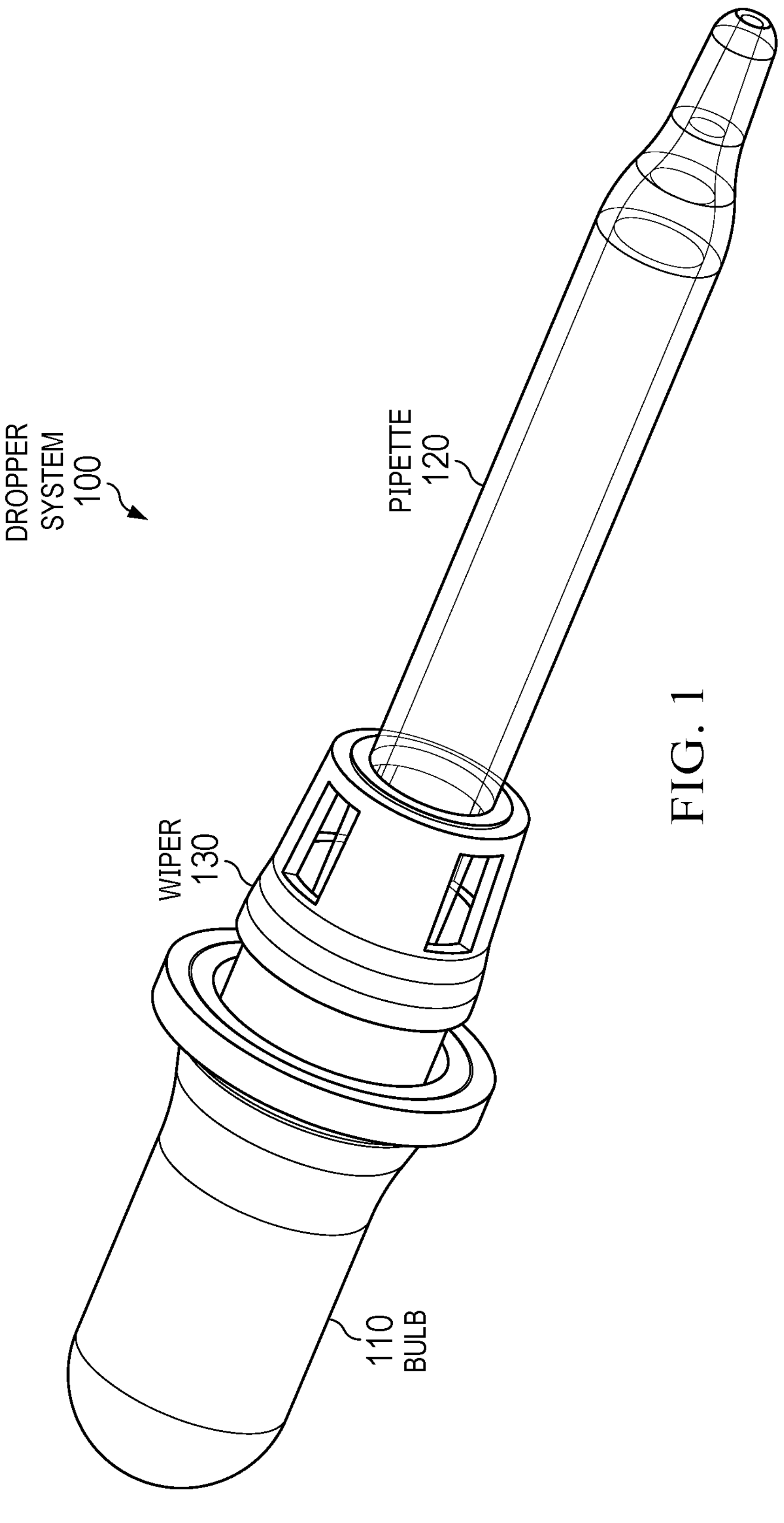
FIG. 1 shows a dropper system in accordance with one or more embodiments of the invention.

Turning to FIG. 1, a dropper system is shown according to illustrative embodiments. The dropper system (100) is a liquid-handling device configured to facilitate the controlled transfer and dispensing of liquid fluids.

The dropper system (100) may comprise a number of components. As depicted, the dropper system (100) comprises a bulb (110), a pipette (120), and a wiper (130). Each component is designed with specific features that contribute to the overall operation of the system.

The bulb (110) is a resilient, compressible element located at the proximal end of the dropper system. The bulb (110) is constructed from elastomeric or flexible polymer materials to allow repeated compression and expansion.

The bulb (110) is used to regulate liquid intake and release during sampling. When compressed, the bulb (110) expels air. Upon release, expansion of the bulb (110) creates a vacuum that enables fluid to be drawn into the pipette (120) from a surrounding reservoir.

The pipette (120) is an elongated, tubular structure extending from the bulb to the distal end of the dropper system. The pipette (120) serves as the primary conduit for fluid collection, storage, and delivery.

The pipette (120) may be made from transparent or semi-transparent materials, such as glass or plastic, to allow visual monitoring of liquid levels. A distal end of the pipette (120) may include tapered sections to facilitate precision dispensing, controlling the release of the fluid in measured amounts.

The wiper (130) is a flexible component prepositioned around the pipette near its proximal end, adjacent to the bulb (110). The wiper (130) functions to remove excess liquid from the outer surface of the pipette (120) during operation, thereby minimizing drips and promoting clean dispensing of fluids. The particular design of the wiper (130) can vary depending on the viscosity of the fluid and the desired dispensing rate.

The wiper (130) may be made from flexible polymers or elastomeric materials to provide a snug fit around the pipette. As shown, the wiper (130) may include a set of radial slots or openings, which allow for controlled flexing around the pipette (120).

The wiper (130) may be used in bottles containing fluid medications, essential oils, cosmetic serums, and other related products where precise dosing and cleanliness are important. For example, the wiper (130) may help to control the amount of fluid dispensed from the bottle. When a dropper is inserted back into the bottle, the wiper removes excess fluid from the outside of the pipette, ensuring that only the fluid inside the dropper's bulb is dispensed.

In another example, the wiper (130) may help to prevent dripping. When a dropper is removed from the bottle, the wiper (130) squeegees away excess fluid from the pipette, helping to prevent drips that can occur and keeping the bottle and surrounding area clean. For products that can be affected by exposure to air, such as certain cosmetics or medications, the wiper (130) helps to minimize the amount of air that enters the bottle, thereby preserving the quality of the contents.

Figure 2:
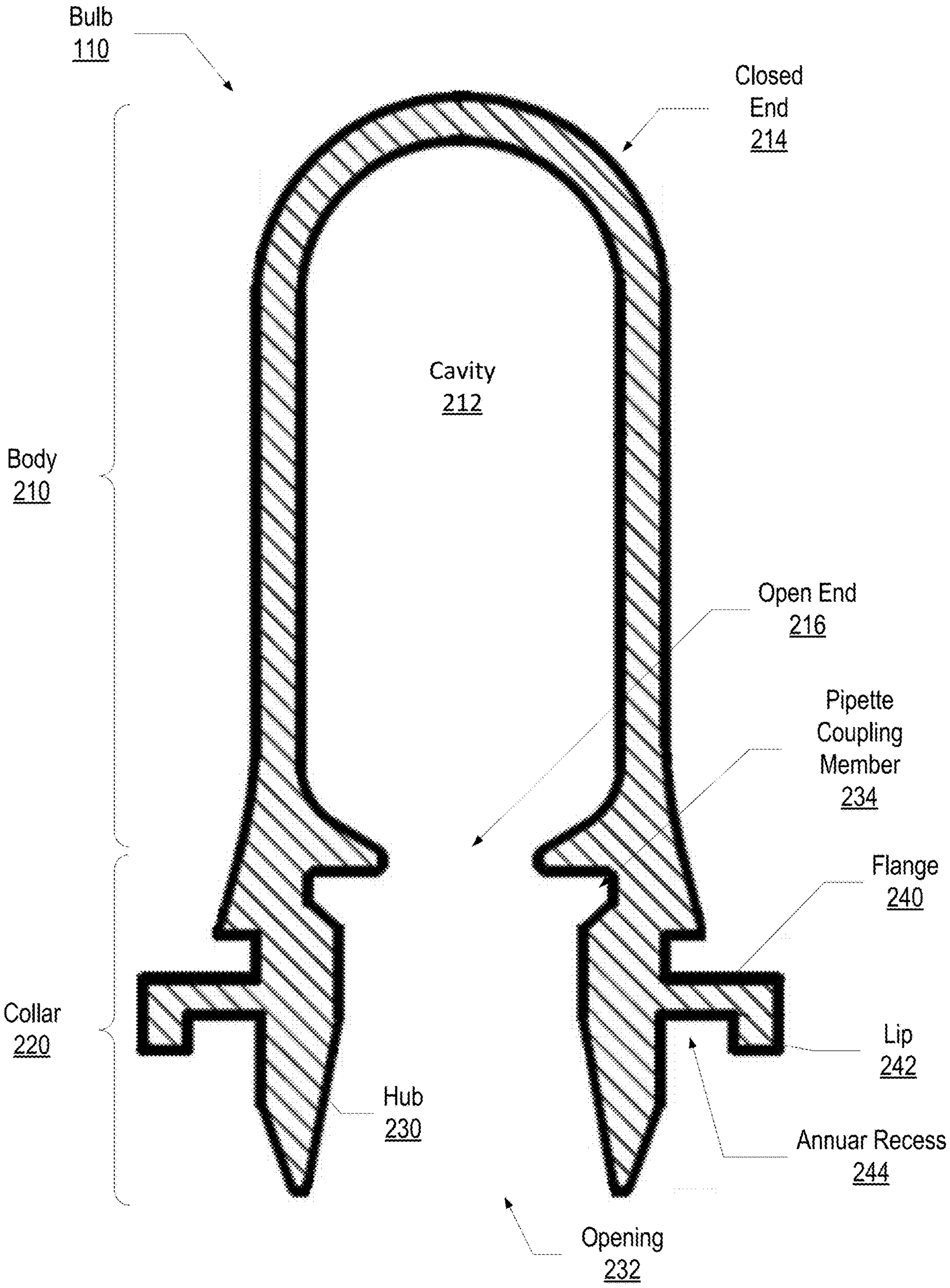
FIG. 2 shows a cross-sectional view of a bulb (110) in accordance with one or more embodiments of the invention.

Referring now to FIG. 2, a cross-sectional view of bulb (110) is illustrated in accordance with the disclosed embodiments. The bulb (110) comprises a body (210) and a collar (220).

The body (210) is the main structure of the bulb (200), encompassing the cavity (212). The body is made from a flexible material that allows it to be squeezed, causing the internal volume of the cavity to decrease and the fluid to be expelled through the open end. Compression of the body (210) is used to draw in and dispense fluid through a pipette connected to the body (210). The body is designed to return to its original shape after compression, ready to draw in fluid when the pressure is released.

The body (210) has a closed end (214) and an open end (216), with the open end being opposite the closed end. The closed end (214) is integral to the structure of the bulb and is sealed to contain a fluid inside the cavity (212), providing an endpoint that helps maintain the fluid within the bulb's cavity when it is not being squeezed. The closed end (214) is the terminus of the body (210), opposite to the opening (232) where a pipette may be attached.

The open end (216) is positioned along the body (210) opposite the closed end (214), and may connect to a pipette. The open end (216) allows the fluid contained within the cavity to be dispensed when the body is squeezed. The open end (216) may be shaped to facilitate the attachment of a pipette, which will channel the fluid out of the bulb when it is used.

The cavity (212) is the internal hollow space within the bulb's body, extending between the closed end (214) and the open end (216). The cavity (212) holds the fluid that is drawn into and expelled from the body (210) through the open end (216). The cavity (212) may be configured to hold a specific volume of fluid, which can be expelled when pressure is applied to the body (210).

The collar (220) extends axially from the open end (216) of the body (210). The collar (220) serves as an interface between the dropper system (100) and a fluid containing reservoir, such as a bottle. The collar (220) comprises a hub (230) and a flange (240).

The hub (230) is a protruding section of the collar that extends axially from the open end (216) of the body (210). The hub (230) provides a transitional part between the body of the bulb and the pipette, encircling the opening through which the fluid will pass into the pipette. The hub may be designed to support the structural integrity of the pipette attachment area and may aid in the proper positioning of the pipette.

As depicted, the inner surface of the hub is tapered between the pipette coupling member (234) and the opening (232). In other words, a thickness of the hub (230) gradually decreases from the pipette coupling member to the opening of the collar. This tapering facilitates easier insertion or removal of the pipette.

Below the hub, an opening (232) provides access to the cavity (212). The opening (232) provides a channel through which the fluid exits the cavity when the bulb's body is compressed.

A pipette, such as pipette (120) of FIG. 1, may be inserted into the collar (220) through the opening (232). The opening (232) may be appropriately sized to allow the pipette to pass through it easily while maintaining the structural integrity of the collar. The design and size of opening (232) may impact how the pipette interacts with the collar and the bulb, affecting the overall functionality of the dropper system.

A pipette coupling member (234) within the collar is designed to securely hold a portion of a pipette. The pipette coupling member (234) can be a recess into an inner surface of the collar (220) that is configured to snuggly fit about a portion of the pipette, thereby retaining at least a portion of a pipette proximate the cavity of the body.

The pipette coupling member (234) of the bulb is where a pipette would be attached, and is designed to interface with the pipette, providing a secure fit to ensure that the pipette remains attached to the bulb during the operation of the dropper system. This narrow portion may be disposed between the cavity (212) and the pipette coupling member (234). This narrow portion may at least partially inhibit movement of the pipette out of the opening (232) and/or into the cavity (212).

The pipette coupling member (234) can be delimited by a narrow portion of the bulb's body, located proximate to the open end. This narrow portion is a constriction or a tapered area within the cavity, and may be positioned near the open-end aiding in the controlled movement of fluid and accurate seating of the pipette within the bulb.

A flange (240) extends radially from an outer surface of the collar: The flange (240) is an extended rim or edge that comes out from the outer surface of the collar. As used herein, radial extension means that the flange (240) spreads planarly outwards in all directions from a point of attachment. The flange serves as an interface between the dropper and the bottle. The flange may serve as a stabilizing feature or as an interface with another component of the dropper system, such as wiper (130). When the dropper is in use, the flange may provide a resting point or a seal against the bottle neck. The flange's diameter may be sized to ensure a proper fit and seal when the dropper system (100) is inserted into a bottle.

The flange (240) comprises a lip (242). The lip (242) protrudes axially about a perimeter of the flange (240): The lip (142) encircles the perimeter of the flange (240), defining an annular recess (244). The lip (142) may be integrally formed with the flange (140), protruding from the flange in a direction parallel to an axis of the bulb (200).

The annular recess (244) is a ring-shaped space delineated by the lip (242) and the outer surface of the collar (220). This annular recess (244) may accommodate a corresponding feature of another component, such as a sealing element, providing a specific fit or function within the dropper system assembly. For example, the annular recess (244) may be configured to interact with a flange (410) of wiper (130), described infra at FIG. 4.

Figure 3:
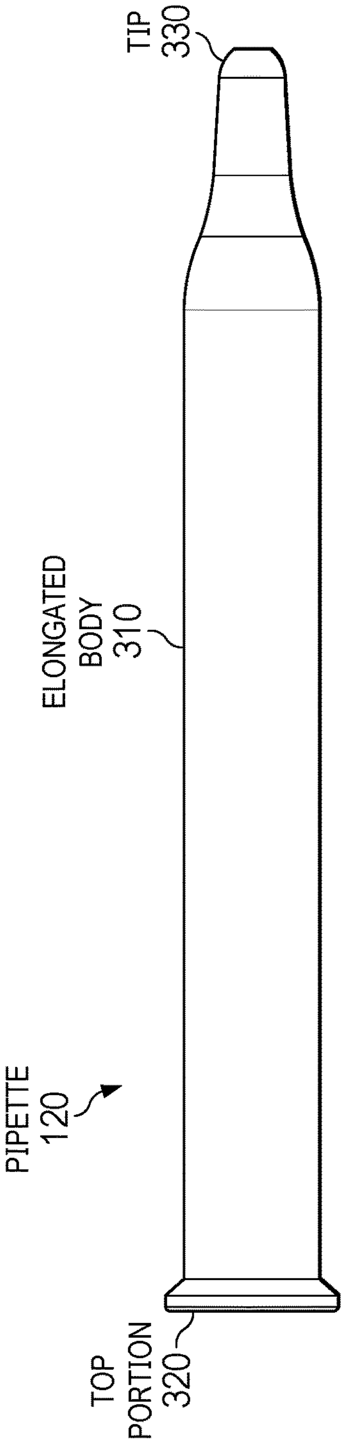
FIG. 3 shows a pipette in accordance with one or more embodiments of the invention.

Referring now to FIG. 3, a pipette (120) is illustrated in accordance with the disclosed embodiments. The pipette (120) comprises an elongated body (310), a top portion (320), and a tip (330).

As illustrated, the pipette (120) may include an elongated body (310) that extends along a length between the top portion (320) and the tip (330) of the pipette (120). A lumen may extend within the elongated body (310) between a first opening in the top portion (320) and a second opening at the tip (330) (e.g., the lumen may terminate at the first opening and the second opening of the pipette).

As illustrated, the top portion (320) may form a flange that extends radially outward from the elongated body (310) of the pipette (120). The top portion (320) may facilitate retention of the pipette (120) within the bulb (110). For example, the top portion (320) may be received within the pipette coupling member (234) of the bulb (110).

The tip (330) may be a tapered portion of the pipette (120) proximate the second end. The of the pipette (120) may be linear (e.g., in line with the body of the pipette) or bent.

Figure 4:
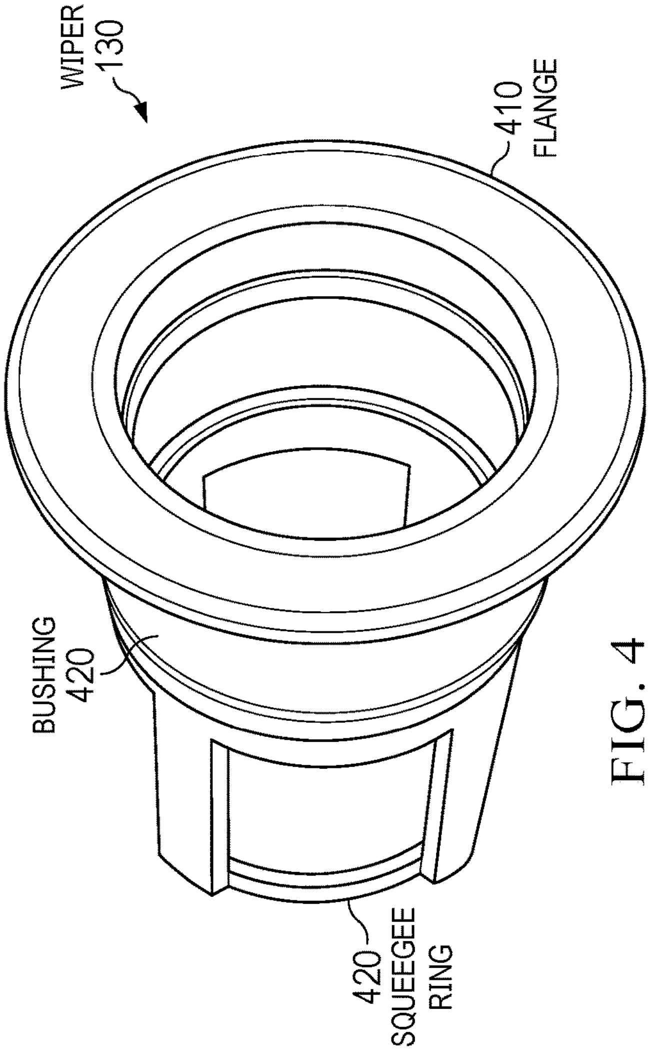
FIG. 4 shows a wiper in accordance with one or more embodiments of the invention.

Referring now to FIG. 4, a wiper is illustrated in accordance with the disclosed embodiments. The wiper (130) is an insert for a dropper bottle, typically into the neck of the bottle, to control dispensing, prevent dripping, and/or maintains product quality.

The wiper (130) may be used in bottles containing fluid medications, essential oils, cosmetic serums, and other related products where precise dosing and cleanliness are important. The particular design of the wiper (130) can vary depending on the viscosity of the fluid and the desired dispensing rate.

For example, the wiper (130) may help to control the amount of fluid dispensed from the bottle. When a dropper is inserted back into the bottle, the wiper removes excess fluid from the outside of the pipette, ensuring that only the fluid inside the dropper's bulb is dispensed.

In another example, the wiper (130) may help to prevent dripping and/or help to maintain product quality: When a dropper is removed from the bottle, the wiper (130) squeegees away excess fluid from the pipette, helping to prevent drips that can occur and keeping the bottle and surrounding area clean. For products that can be affected by exposure to air, such as certain cosmetics or medications, the wiper (130) helps to minimize the amount of air that enters the bottle, thereby preserving the quality of the contents.

The wiper (130) includes a flange (410). The flange (410) is a protruding rim or edge that forms a circumferential lip at one end of the wiper. The flange is designed to fit securely within the annular recess (244) of the bulb (110), providing a stable connection between the wiper and the bulb. This connection ensures proper alignment and prevents displacement of the wiper during insertion.

The flange (410) may have a diameter greater than the opening of the neck of a bottle into which the wiper is inserted. The flange's diameter ensures that the dropper is correctly positioned and secured after filling the bottle. The flange's diameter may also prevent the flange from slipping into the bottle while also aiding in the creation of a leak-proof seal.

The bushing (420) is the main cylindrical body of the wiper, positioned beneath the flange. The bushing is sized to press fit within the neck of a corresponding bottle, creating a tight seal that stabilizes the wiper and prevents movement.

A squeegee ring (430) extends beneath the bushing (420). The squeegee ring is an annular ring that interfaces with the pipette, sliding around the outer surface of the elongated body (310). In use, the squeegee ring (430) may remove excess fluid from the exterior of the pipette as it is withdrawn from the bottle, reducing the likelihood of drips or spills.

The wiper may include slots or openings along its body. These slots provide flexibility, allowing the wiper to conform to the dimensions of the pipette. The slots may reduce material usage and simplify cleaning.

Figure 5:
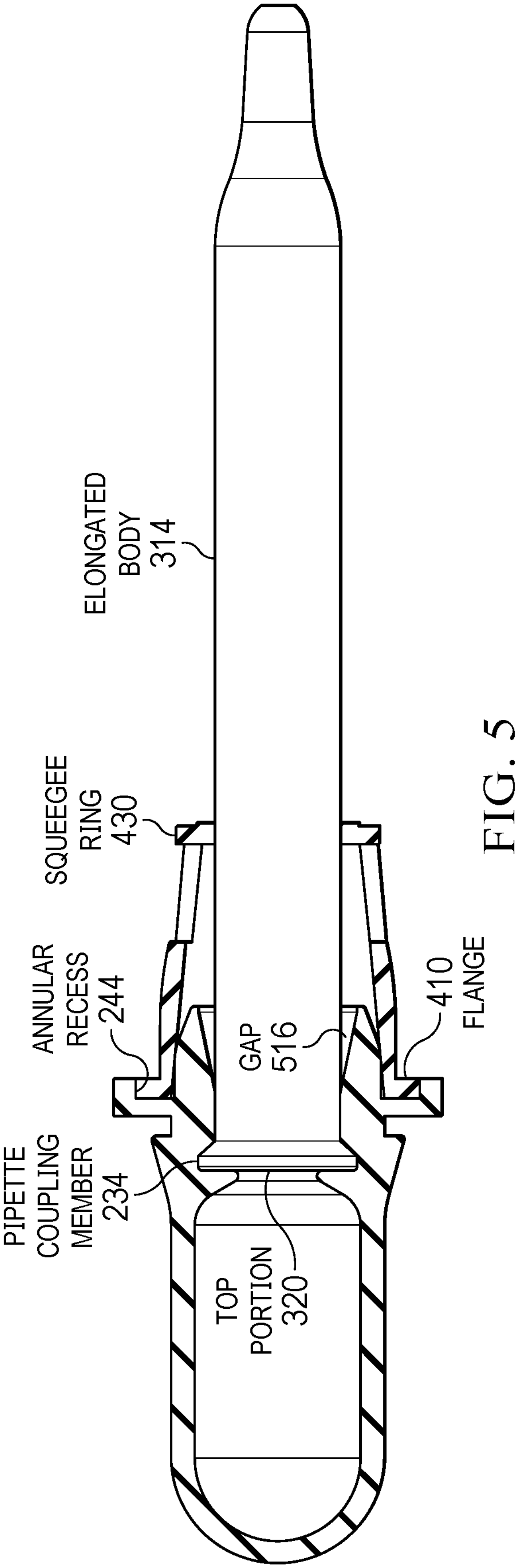
FIG. 5 shows a cross-sectional view of the bulb, pipette, and wiper assembly in accordance with one or more embodiments of the invention.

Referring now to FIG. 5, a cross-sectional view of the bulb, pipette, and wiper assembly is shown according to illustrative embodiments. As depicted, FIG. 5 details the relative position and functional interaction of the components, emphasizing the prepositioning of the wiper within the assembly to facilitate the attachment process.

As illustrated, the bulb's cavity (212) is aligned with narrow portion aligned with elongated body (314). When the bulb is depressed, the fluid inside is directed into the lumen for dispensing. This alignment facilitates the direct flow of fluid from the bulb into the pipette, allowing for accurate and controlled fluid dispensing, which may enhance the usability and functionality of the dropper system.

The bulb includes a top portion (320) and a base with an annular recess (244). The annular recess is configured to receive the flange (410) of the wiper, securing it in place prior to assembly with the bottle. The prepositioning of the wiper in this manner simplifies the assembly process, allowing the wiper to remain attached to the bulb-pipette assembly before the system is connected to a liquid-filled bottle.

The wiper is secured to the bulb through the engagement of its flange (410) with the bulb's annular recess (244). This prepositioning eliminates the need for separately inserting the wiper into the bottle after it has been filled with liquid. Instead, the dropper system, with the prepositioned wiper, can be attached to the filled bottle in a single step, simplifying the assembly process and reducing the risk of overflow, misalignment, or contamination.

The squeegee ring (430), which contacts the outer surface of the elongated body (314) of the pipette. The squeegee ring removes excess liquid from the pipette during withdrawal, ensuring clean and controlled dispensing. The wiper also serves as a stabilizing and sealing interface, aligning the pipette with the assembly, and maintaining its position during operation.

The pipette coupling member (234) secures the top portion (320) of the pipette within the bulb. The elongated body (314) of the pipette extends through the wiper and beyond the assembly for liquid handling. The pipette functions as the conduit for liquid aspiration and dispensing. The coupling member ensures proper alignment of the pipette with the bulb and wiper.

As depicted, a gap (516) s visible between the pipette coupling member and the wiper. This gap accommodates slight movement or alignment adjustments, ensuring that the pipette operates smoothly within the assembly.

In some embodiments, the gap (516) is a frustoconical gap between the collar and the pipette. The size of this gap decreases or becomes narrower when the collar is inserted into the neck of the bottle. This decrease in the gap size may be a result of the compression of the collar as it fits into the neck opening, which is a narrower space compared to the collar's resting state. The decrease in gap size enables the dropper system to adapt to the insertion action, enhancing the seal or fit of the dropper system when in use, thereby improving efficiency and leak prevention.

Figure 6A:
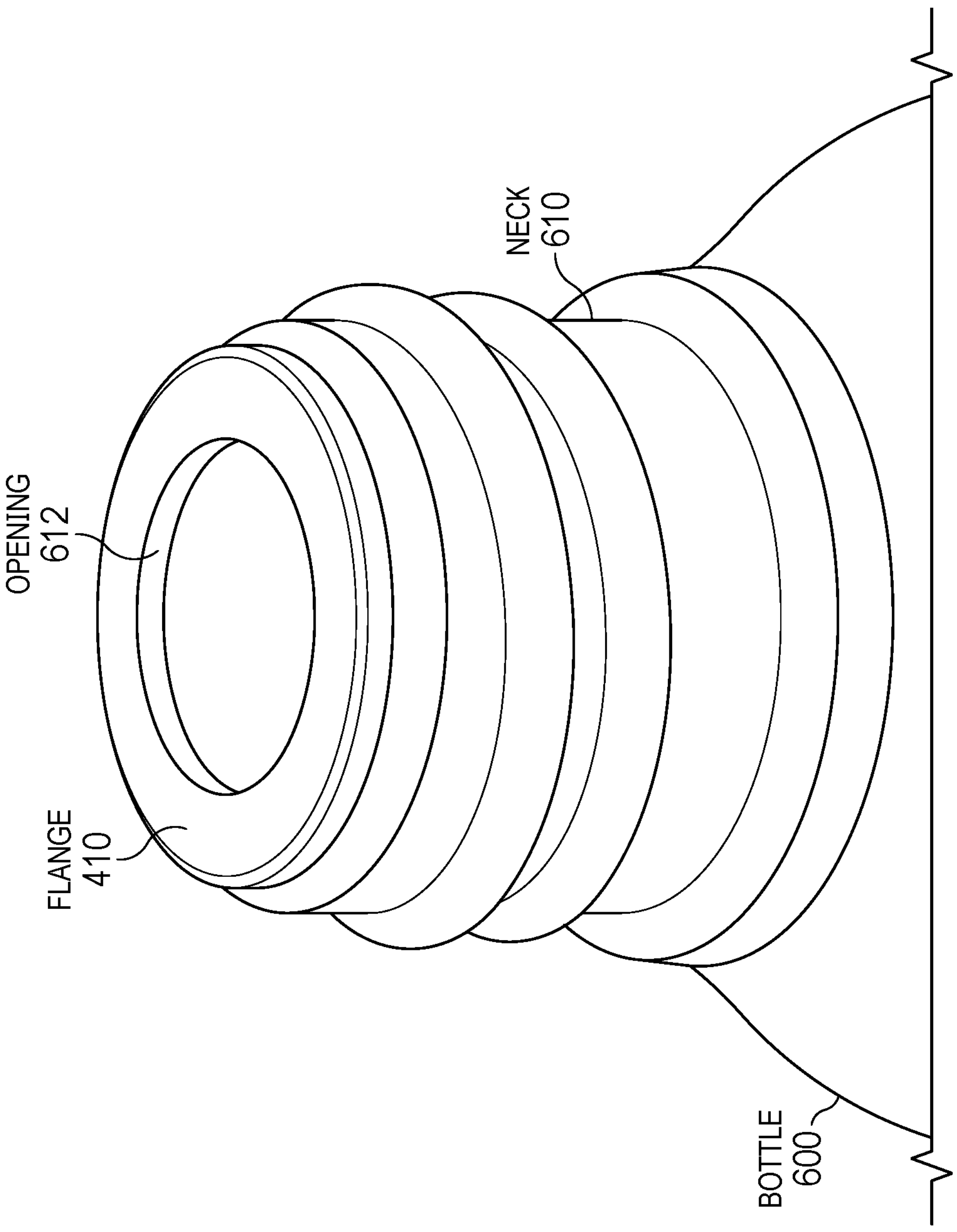
FIGS. 6A and 6B show a bottle as part of the dropper system in accordance with one or more embodiments of the invention.

Referring now to FIG. 6A, a bottle is shown as part of the dropper system, according to the illustrative embodiments, the bottle 600 is designed to work in tandem with the dropper's components.

As illustrated, the bottle (600) comprises neck (610). The neck is a narrowed part extending from the main body of the bottle. The neck is configured to accommodate the dropper, ensuring easy insertion and removal while maintaining a seal that prevents leaks.

The neck (610) includes an opening (612) that extends through the neck (610). The opening is a passage through which the contents of the bottle can be accessed or dispensed. The opening in the neck of the bottle serves as the primary access point to the bottle's interior, where the fluid or substance contained within the bottle is stored. The opening (612) may be appropriately sized and shaped to accommodate the dropper, including its collar, flange, and wiper components. For example, the opening may be large enough to allow the dropper, along with its various components like the collar and wiper, to be inserted into the bottle without undue force, yet snug enough to ensure a tight seal when the dropper is in place.

As illustrated, the diameter of the flange is larger than the diameter of the opening in the neck of the bottle, the diameter of the flange ensures that when the dropper is inserted into the bottle, the flange sits atop the neck, preventing the dropper from being fully inserted into the bottle. The larger diameter of the flange relative to the neck opening acts as a barrier, sealing the interface to prevent leakage of the bottle's contents, and ensuring that the dropper remains securely in place. Thus, the diameter of the flange may aid in the proper positioning of the dropper and in creating a seal between the dropper and the bottle.

Figure 6B:
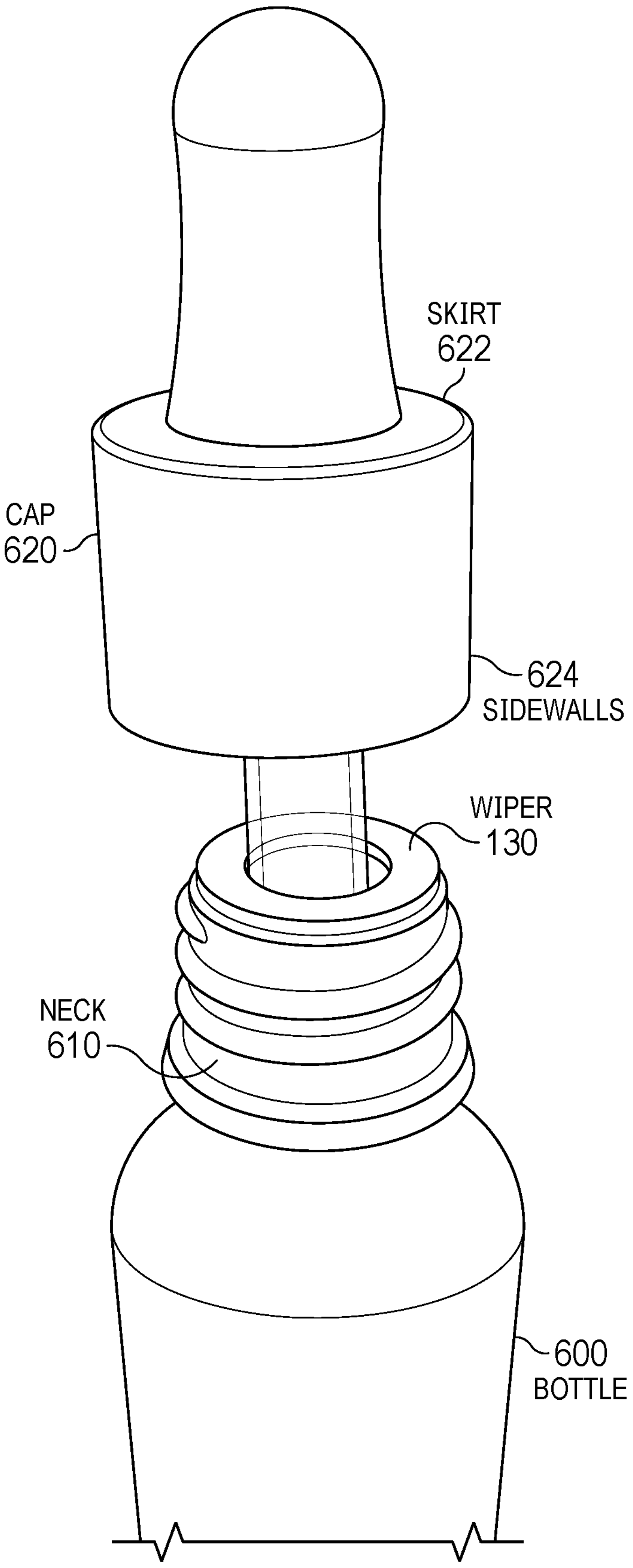

As illustrated in FIG. 6B, the wiper is retained in the neck when the collar is inserted into the bottle. This retention of the wiper in the neck ensures that the wiper, once positioned, remains fixed in place within the neck of the bottle, independent of the movement or position of the collar. Withdrawing of the pipette does not remove the wiper. In other words, When the collar of the dropper system is inserted into the bottle's opening, the wiper is designed to remain within the neck of the bottle, independent of the collar's insertion or removal. The wiper remains in place to perform its intended function (such as wiping excess fluid from the pipette or maintaining a seal within the neck) even when the dropper is not in the bottle. Retention of the wiper may also ensure that the wiper, which may be in contact with the fluid, does not come out unintentionally and cause spillage or contamination.

As illustrated in FIG. 6B, in some embodiments, the dropper system may include a cap (620) having a skirt (622) and sidewalls (624). The cap includes a skirt, which is a flared or extended portion that forms the lower part of the cap.

The skirt (622) includes an aperture or opening through which the bulb of the dropper can be disposed. skirt is received by a recess of the bulb, such as in a specific recessed area on the bulb designed to accommodate or interact with the skirt, ensuring a secure and stable fit when the cap is in place. The bulb protrudes through the aperture when the cap is placed on the bottle, allowing for easy access to the bulb while the cap is in place.

The cap (620) may also include side walls that extend from the perimeter of the skirt. These side walls are designed to be positioned close to, or in proximity to, the outer side walls of the neck of the bottle when the pipette is inserted into the bottle. The side walls of the cap, designed to be close to the bottle's neck, contribute to a secure and aligned fit of the cap, protecting the contents of the bottle, and facilitating ease of use.

The sidewalls (624) may interface with the neck (610) of bottle (600). In some embodiments, the side walls are threaded, the threads on the cap's side walls are designed to mate with corresponding threads on the exterior of the bottle's neck. Threads on the cap and the bottle are complementary, allowing them to interlock when the cap is twisted onto the bottle, the sidewalls (624) may provide a secure and snug fit, preventing contamination and maintaining the integrity of the bottle's contents. The close proximity of the side walls to the bottle's neck may aid in aligning the cap correctly, ensuring that it is easy to put on and take off without disturbing the positioning of the pipette or the bulb.

While FIG. 1-6 show a configuration of components, other configurations may be used without departing from the scope of the invention. For example, various components may be combined to create a single component. As another example, the functionality performed by a single component may be performed by two or more components.

Figure 7:
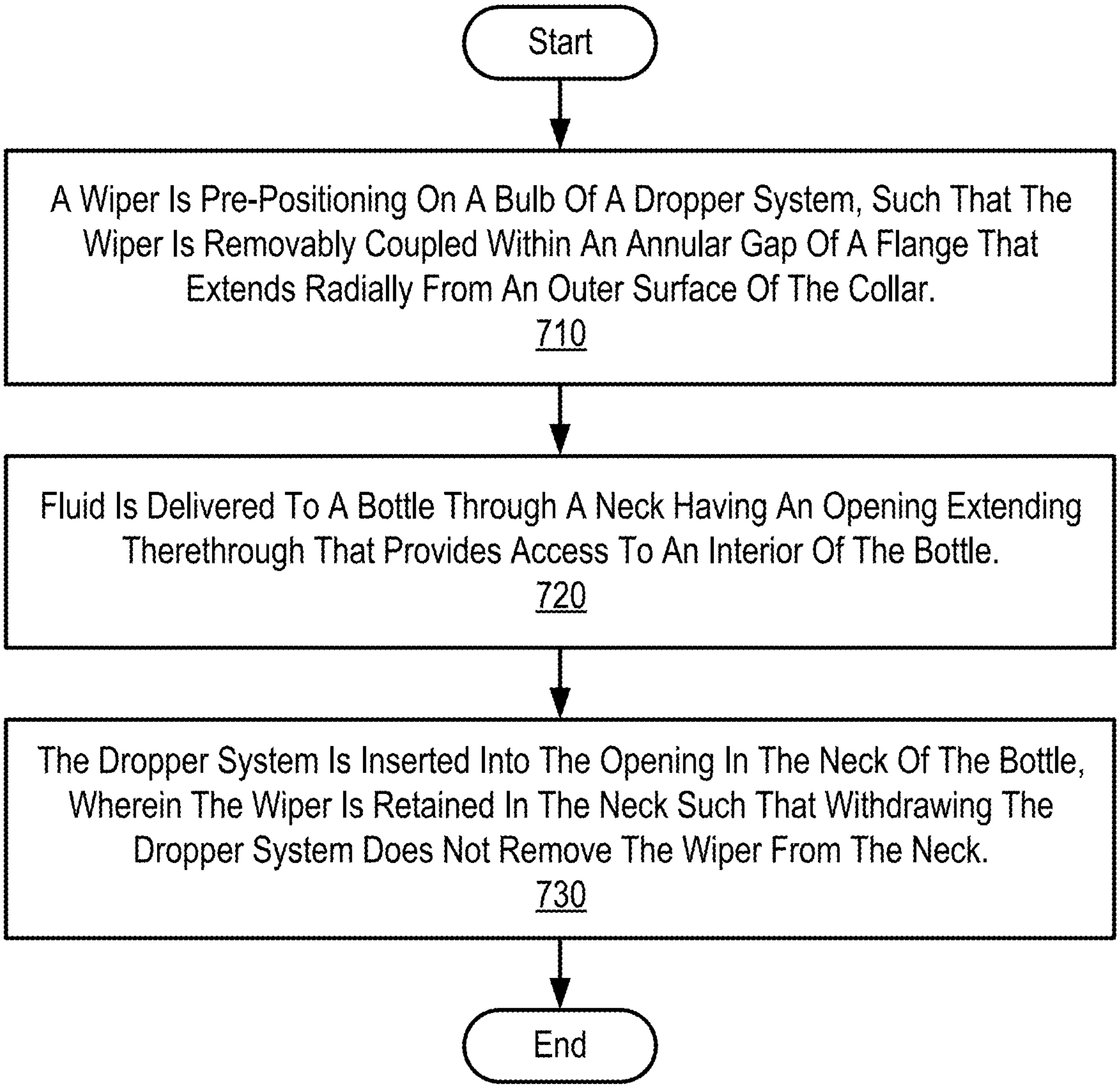
FIG. 7 is a method for filling a bottle according to illustrative embodiments.

Turning to FIG. 7, a method for filling a bottle is shown according to illustrative embodiments, the method illustrated in FIG. 6 can be performed using one or more components of FIGS. 1-6.

At Step 710, a wiper prepositioned onto a bulb of the dropper system. The wiper is removably coupled within an annular gap of a flange that extends radially from an outer surface of the collar on the bulb. This step secures the wiper in place on the dropper system prior to its assembly with the bottle. The prepositioning of the wiper eliminates the need to insert it into the bottle separately and ensures that the wiper remains aligned during subsequent steps.

At Step 720, the is filled. Fluid is delivered to a bottle through a neck that includes an opening providing access to the bottle's interior. This step involves filling the bottle with the desired liquid, ensuring it is ready for the attachment of the dropper system. The neck of the bottle is designed to interface with the dropper system, specifically the wiper, during the subsequent assembly step.

At Step 730, the dropper system is inserted into the bottle. The dropper system, with the prepositioned wiper, is inserted into the opening of the neck of the bottle. During insertion, the wiper is retained within the neck of the bottle. The retention of the wiper ensures that withdrawing the dropper system from the bottle does not remove the wiper from its position in the neck. This configuration ensures a proper seal and maintains the wiper's functionality for removing excess liquid from the pipette during operation.

The dropper system is now securely assembled with the bottle, ready for use. The prepositioning of the wiper and its retention within the neck of the bottle during assembly streamline the process and reduce the risk of misalignment or operational issues.

Thus, the illustrative embodiments provide a dropper system featuring a prepositioned wiper integrated with a bulb and pipette assembly. The wiper is removably coupled to the bulb by engaging with an annular recess in the flange, allowing for secure prepositioning before assembly with a liquid-filled bottle. This configuration simplifies the assembly process by enabling the entire dropper system, including the wiper, to be attached to the bottle in a single step after filling. The wiper is designed to fit within the neck of the bottle, where it remains securely retained even if the dropper system is removed. The system ensures precise alignment of components, efficient liquid transfer, and effective wiping of the pipette to remove excess liquid during operation.

This dropper system described herein addresses key limitations of traditional wiper systems, where the wiper is typically inserted into the bottle separately after the bottle is filled. Such methods often involve additional steps, increased complexity, and a higher risk of misalignment or contamination. By integrating the wiper into the dropper system before assembly, the current dropper system reduces assembly time and enhances operational reliability. Additionally, the secure retention of the wiper in the neck of the bottle prevents unintended displacement, maintaining the integrity of the seal and the wiping functionality.

The bulb of the dropper system that establishes a leak-resistant seal with the interior surface of the pre-positioned wiper. The interior of the wiper conforms tightly to the bulb's outer surface when inserted to prevent fluid leakage. This configuration minimizes potential leak paths and achieves a leak-resistant seal while maintaining the streamlined pre-positioning and assembly process.

While the various steps in this flowchart are presented and described sequentially, at least some of the steps may be executed in different orders, may be combined, or omitted, and some of the steps may be performed in parallel. Furthermore, the steps may be performed actively or passively.

The term "about," when used with respect to a physical property that may be measured, refers to an engineering tolerance expected by or determined by one ordinary skill in the art. The exact quantified degree of an engineering tolerance depends on the product being produced, the process being performed, or the technical property being measured. For a non-limiting example, two angles may be "about congruent" if the values of the two angles are within ten percent of each other. However, if the ordinary artisan determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A could have been separate from component B, but is joined to component B in either a fixed or a removably attached arrangement. In a second meaning, unless otherwise stated, "connected to" means that component A is integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such, includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A dropper system comprising:
a bulb, wherein the bulb comprises:
- a body of the bulb, wherein the body of the bulb comprises:
  - a closed end;
  - an open end opposing the closed end; and
  - a cavity extending between the closed end and the open end;
- a collar extending axially from the open end of the body, wherein the collar comprises:
  - a pipette coupling member that is recessed into an inner surface of the collar, wherein the pipette coupling member is configured to retain at least a portion of a pipette proximate the cavity of the body, wherein the inner surface is tapered between the pipette coupling member and an opening of the collar; and
  - a collar flange that extends radially from an outer surface of the collar, wherein the collar flange comprises:
    - a lip protruding axially about a perimeter of the collar flange such that an annular recess is formed between the outer surface of the collar and the lip; and
    - a wiper that is pre-positioned around the collar, wherein the wiper comprises a wiper flange that is removably coupled within the annular recess.

2. The dropper system of claim 1, wherein the annular recess defines a negative shape of the wiper flange of the wiper.

3. The dropper system of claim 1, further comprising:

a bottle, wherein the bottle comprises:

a neck having an opening extending therethrough and providing access to an interior of the bottle.

4. The dropper system of claim 3, wherein the wiper flange has a diameter greater than the opening of the neck.

5. The dropper system of claim 3, wherein the wiper is retained in the neck when the collar of the bulb is inserted into the opening, such that withdrawing the collar does not remove the wiper from the neck.

6. The dropper system of claim 3, wherein the collar is at least partially compressed when the collar of the bulb is inserted into the opening of the neck such that leaks are inhibited.

7. The dropper system of claim 3, further comprising:

a pipette comprising:

a top portion received in the pipette coupling member such that the pipette and the bulb may be removably coupled; and an elongated body having a lumen disposed there-through, wherein a frustoconical gap is formed between an inner wall of the collar and the pipette when the top portion is positioned in the pipette coupling member.

8. The dropper system of claim 7, wherein:

the collar further comprises a collar opening that provides access to the cavity, and a diameter of the collar opening is greater than a diameter of the elongated body of the pipette.

9. The dropper system of claim 7, wherein the frustoconical gap decreases when the portion of the collar is positioned into the opening of the neck.

10. The dropper system of claim 7, wherein the cavity further comprises:

a narrow portion that is proximate the open end of the body of the bulb, wherein the narrow portion is aligned with the lumen such that fluid in the bulb is transmitted to the lumen when the bulb is depressed.

11. The dropper system of claim 7, wherein the pipette comprises a tip that is disposed at an angle relative to the elongated body.

12. The dropper system of claim 3, further comprising:

a cap comprising:

a skirt including an aperture through which the bulb may be disposed, wherein the skirt is received by the recess of the bulb; and side walls extending from the skirt, wherein the side walls may be disposed proximate to outer side walls of the neck of the bottle when the pipette is disposed in the bottle.

13. The dropper system of claim 12, wherein the side walls of the cap comprise threads configured to mate with threads on an exterior of the bottle.

14. The dropper system of claim 12, wherein at least a portion of the skirt is perforated such that the portion of the skirt separates when the skirt is removed from the bottle.

15. A method for filling a bottle comprising:

pre-positioning a wiper around a collar of a bulb, such that the wiper is removably coupled within an annular recess of a collar flange that extends radially from an outer surface of the collar;

delivering a fluid to the bottle through a neck having an opening extending therethrough that provides access to an interior of the bottle; and inserting the collar of the bulb is inserted into the opening, wherein the wiper is retained in the neck such that withdrawing the collar does not remove the wiper from the neck.

* * * * *